(12) United States Patent
Ziraldo et al.

(10) Patent No.: US 12,441,422 B2
(45) Date of Patent: Oct. 14, 2025

(54) FOLDABLE SEAT WITH LATCHING MECHANISM FOR PERSONAL TRANSPORT DEVICE

(71) Applicants: Honda Motor Co., Ltd., Tokyo (JP); JD Components Co., Ltd., Taichung (TW)

(72) Inventors: Nicholas P. Ziraldo, Powell, OH (US); Matthew B. Staal, Torrance, CA (US); Ming Hsein Lee, Taichung (TW); Ding Jong Chou, Taichung (TW); Sheng Yu Huang, Taichung (TW)

(73) Assignees: HONDA MOTOR CO., LTD., Tokyo (JP); JD COMPONENTS CO., LTD., Taichung (TW)

( * ) Notice: Subject to any disclaimer, the term of this patent is extended or adjusted under 35 U.S.C. 154(b) by 251 days.

(21) Appl. No.: 18/187,320

(22) Filed: Mar. 21, 2023

(65) Prior Publication Data

US 2024/0317341 A1    Sep. 26, 2024

(51) Int. Cl.
    *B62J 1/08*      (2006.01)
    *B62J 1/02*      (2006.01)

(52) U.S. Cl.
    CPC .. *B62J 1/08* (2013.01); *B62J 1/02* (2013.01)

(58) Field of Classification Search
    CPC .................. B62J 1/00; B62J 1/02; B62J 1/08
    See application file for complete search history.

(56) References Cited

U.S. PATENT DOCUMENTS

| | | | |
|---|---|---|---|
| 6,036,214 A | 3/2000 | Ono et al. | |
| 6,095,270 A | 8/2000 | Ishikawa | |
| 7,422,224 B2 * | 9/2008 | Sicz | B62J 1/06 |
| | | | 280/281.1 |
| 8,007,042 B2 | 8/2011 | Arnold et al. | |
| 8,454,086 B2 | 6/2013 | Kim | |
| 10,392,065 B2 | 8/2019 | Shenkerman | |
| 10,549,810 B2 * | 2/2020 | Block | B62L 3/08 |
| 11,046,385 B1 * | 6/2021 | Anderegg | B62K 27/003 |
| 11,827,300 B1 * | 11/2023 | Staal | B62K 3/002 |
| 2020/0307735 A1 * | 10/2020 | Paris | B62K 21/22 |

(Continued)

FOREIGN PATENT DOCUMENTS

| | | |
|---|---|---|
| CN | 2322867 Y | 6/1999 |
| CN | 100333936 C | 8/2001 |
| CN | 206826795 U | 1/2018 |

(Continued)

*Primary Examiner* — Philip F Gabler
(74) *Attorney, Agent, or Firm* — Plumsea Law Group, LLC

(57) ABSTRACT

A foldable seat assembly for a personal transport device is described. The seat assembly includes a seat having a seat surface and a seat post attached to an underside of the seat. The seat assembly also includes a latching mechanism having a pivot mechanism, a clamp located above the pivot mechanism, a latch arm attached to the pivot mechanism at a pivot end of the latch arm, a hooked catch disposed at a catch end of the latch arm opposite the pivot end, and a catch receiver associated with the underside of the seat. The catch receiver engages with the hooked catch of the latch arm. When the clamp is in a locked position, the hooked catch exerts a downward clamping force on the catch receiver to secure the seat in a riding configuration so that the seat surface has a horizontal orientation.

14 Claims, 11 Drawing Sheets

(56) References Cited

U.S. PATENT DOCUMENTS

2020/0339024 A1* 10/2020 Ishida .................. B62J 7/02
2024/0317352 A1* 9/2024 Ziraldo ................ B62K 19/36

FOREIGN PATENT DOCUMENTS

| | | |
|---|---|---|
| IN | 204998677 U | 1/2016 |
| JP | 4140668 B2 | 8/2008 |
| JP | 4209508 B2 | 1/2009 |
| JP | 4663175 B2 | 3/2011 |
| KR | 100492087 B1 | 11/2005 |

* cited by examiner

FOLDABLE SEAT WITH LATCHING MECHANISM FOR PERSONAL TRANSPORT DEVICE

BACKGROUND

This disclosure relates generally to vehicles, and in particular to a foldable seat with a latching mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a latching mechanism for a seat assembly is provided. The latching mechanism includes a pivot mechanism, a clamp located above the pivot mechanism, a latch arm attached to the pivot mechanism at a pivot end of the latch arm, a hooked catch disposed at a catch end of the latch arm opposite the pivot end, and a catch receiver associated with an underside of a seat of the seat assembly. The catch receiver is configured to engage with the hooked catch of the latch arm. When the clamp is in a locked position, the hooked catch is configured to exert a downward clamping force on the catch receiver to secure the seat in a riding configuration.

In another aspect, a seat assembly for a personal transport device is provided. The seat assembly includes a seat having a seat surface and a seat post attached to an underside of the seat. The seat assembly further includes a latching mechanism that includes a pivot mechanism, a clamp located above the pivot mechanism, a latch arm attached to the pivot mechanism at a pivot end of the latch arm, a hooked catch disposed at a catch end of the latch arm opposite the pivot end, and a catch receiver associated with the underside of the seat. The catch receiver is configured to engage with the hooked catch of the latch arm. When the clamp is in a locked position, the hooked catch is configured to exert a downward clamping force on the catch receiver to secure the seat in a riding configuration so that the seat surface has a horizontal orientation.

In another aspect, a seat assembly for a personal transport device is provided. The seat assembly includes a seat having a seat surface, a seat post disposed beneath the seat, a seat support bracket on an underside of the seat attaching the seat post to the seat, and a suspension system on the underside of the seat. The suspension system includes a pair of braces that extend laterally beneath the seat, eyelets disposed at opposite ends of each brace of the pair of braces, and a pair of brace mounts connecting each brace of the pair of braces to a bracket body of the seat support bracket. The brace mounts attach to the brace at a portion of the brace between the eyelets.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a foldable seat having a latching mechanism that assists with securing and stabilizing the seat when the personal transport device in a riding configuration are described herein. The techniques described in connection with the present embodiments may be used to provide a personal transport device having a foldable seat with a latching mechanism that functions to secure the seat in place and also functions to stabilize the seat for a user in a riding configuration.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stored inside the outer casing.

Figure 1:
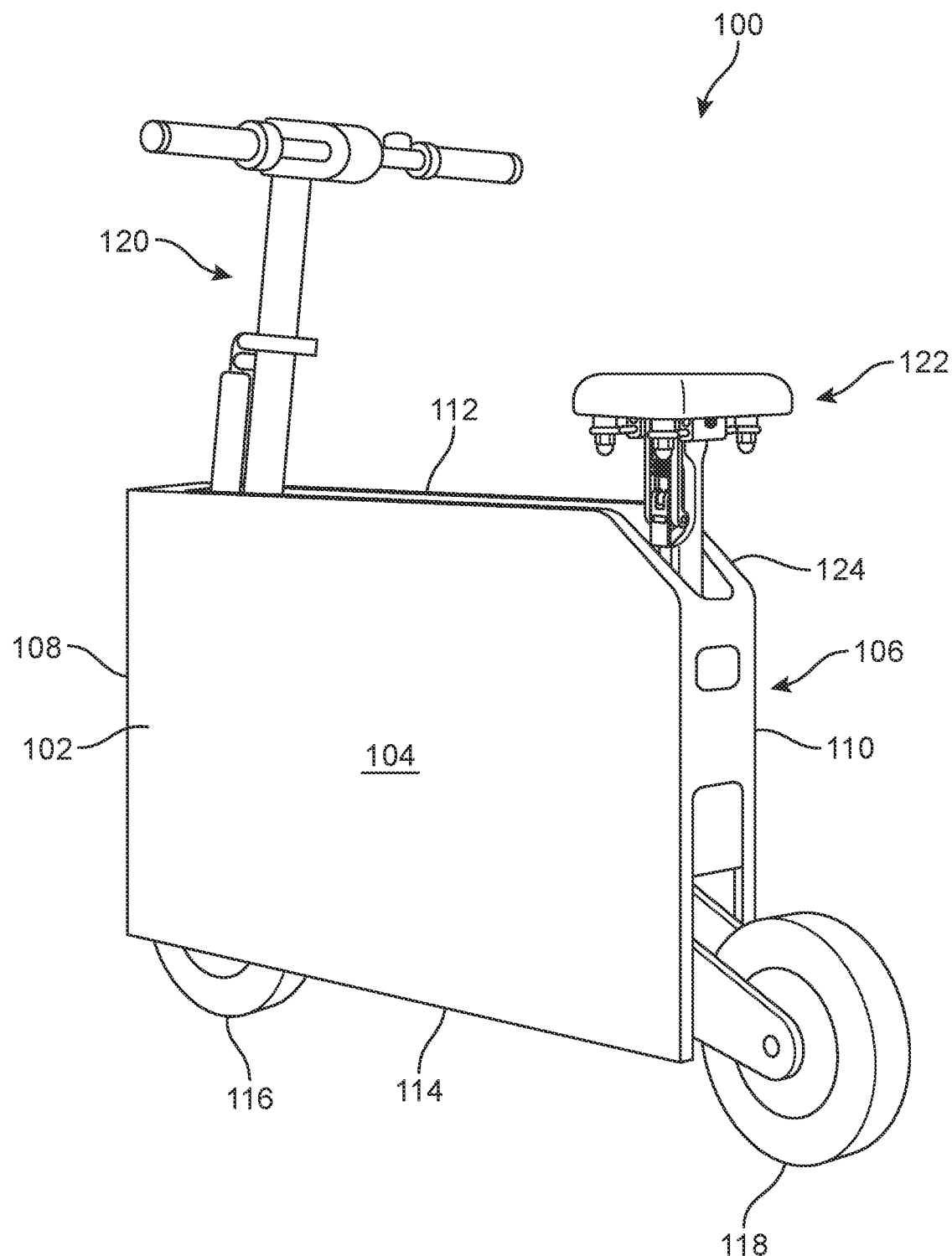
FIG. 1 is an isometric view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stored positions inside outer casing 102. As shown in FIG. 1, electric scooter 100 is in the riding configuration (FIG. 11, described in detail below, shows electric scooter 100 in the stowed configuration).

In an example embodiment, outer casing 102 of electric scooter 100 includes a first side surface 104 and an opposite second side surface 106. Outer casing 102 has a width between the first side surface 104 and the opposite second side surface 106 that defines a thickness of electric scooter 100. In an example embodiment, side surfaces of outer casing 102 are substantially flat, including each of first side surface 104 and the opposite second side surface 106. Outer casing 102 of electric scooter 100 extends between a front edge 108 and an opposite rear edge 110, as well as a top edge 112 and an opposite bottom edge 114. Front edge 108, rear edge 110, top edge 112, and bottom edge 114 are substantially straight and define an outer perimeter of rectangular-shaped outer casing 102 of electric scooter 100.

In this embodiment, a front wheel 116 is visible along bottom edge 114 of electric scooter 100 near front edge 108. Electric scooter 100 also includes a rear wheel 118 that is shown extended outside of outer casing 102 (i.e., in the riding configuration as shown in FIG. 1) along bottom edge 114 near rear edge 110. Rear wheel 118 is configured to slide or retract inside of outer casing 102 in the stowed configuration.

Electric scooter 100 includes a top surface disposed between first side surface 104 and the opposite second side surface 106. In an example embodiment, the top surface includes an opening extending substantially along the length of electric scooter 100 (i.e., from front edge 108 to rear edge 110). In one embodiment, the opening is disposed spaced from front edge 108 of electric scooter 100 and extends all the way to rear edge 110. In some embodiments, the opening extends to rear edge 110 along the top surface 118 partially extends down rear edge 110 (e.g., opening 208 shown in FIG. 2). In one embodiment, the opening is in the form of a slot disposed between first side surface 104 and the opposite second side surface 106.

In some embodiments, electric scooter 100 includes components configured to allow a user to ride electric scooter 100 in the riding configuration. In this embodiment, electric scooter 100 includes a steering assembly 120 and a seat assembly 122. In some embodiments, steering assembly 120 is configured to control orientation of front wheel 116 to allow a user to steer electric scooter 100 in the riding configuration. In an example embodiment, steering assembly 120 includes a handlebar that is configured to receive hands of a user to steer front wheel 116.

In an example embodiment, seat assembly 122 is disposed at the rear of electric scooter 100 at or adjacent to rear edge 110. In some embodiments, the outer perimeter of rectangular-shaped outer casing 102 of electric scooter 100 may include a sloped edge 124 that extends between top edge 112 and rear edge 110 at a downwardly sloped angle. For example, in some cases, the angle of sloped edge 124 may be in a range between 20 degrees and 45 degrees. Seat assembly 122 is disposed directly above sloped edge 124 and provides additional space or room underneath seat assembly 122 compared to a squared edge at the intersection of top edge 112 and rear edge 110. By providing sloped edge 124 under seat assembly 122, a user of electric scooter 100 can easily access and manipulate a latching mechanism of seat assembly 122 to remove seat assembly 122 from electric scooter 100. With this arrangement, electric scooter 100 may be quickly and conveniently transitioned between a riding configuration and a stowed configuration.

It should be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described herein.

Figure 2:
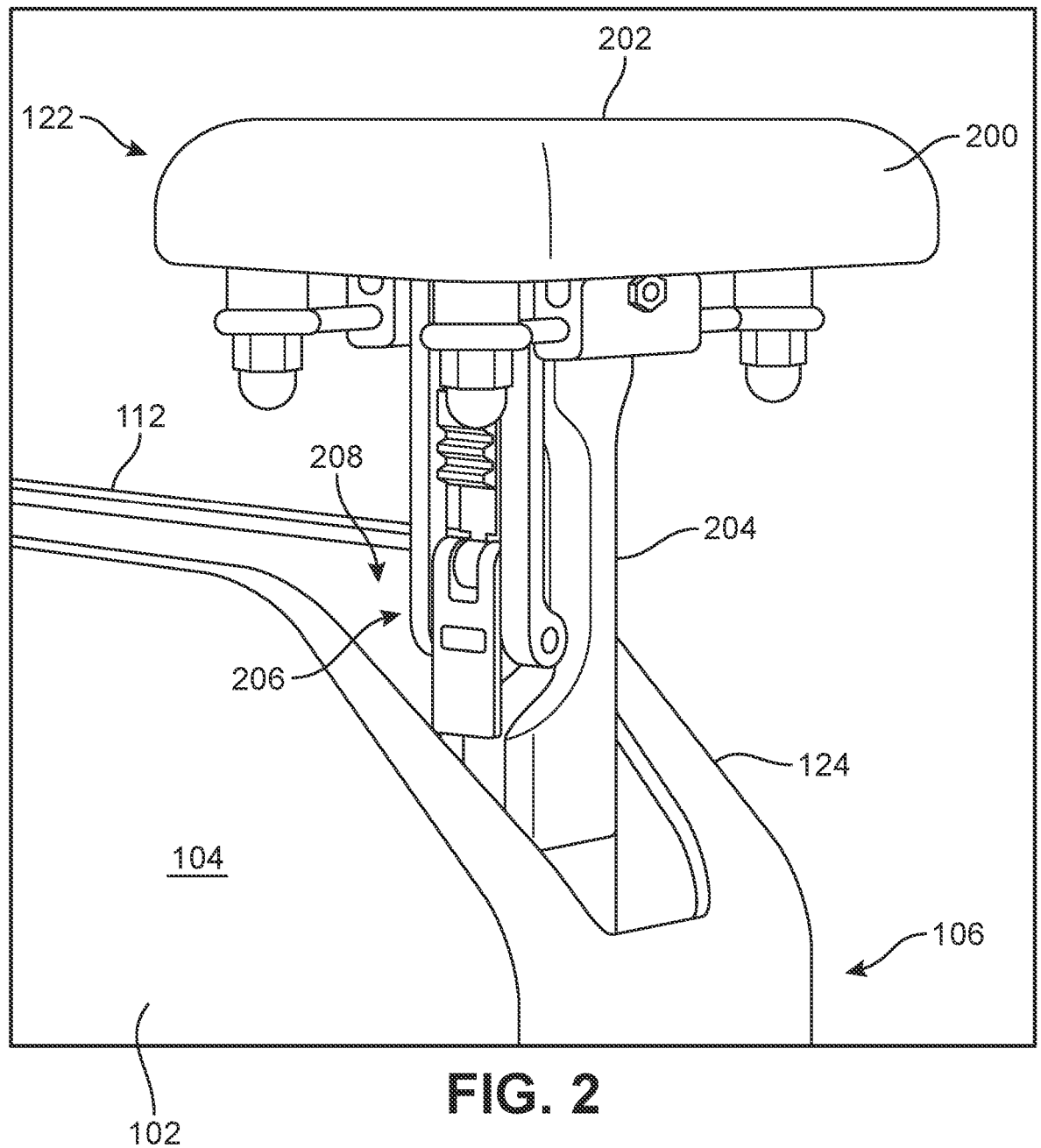
FIG. 2 is an enlarged view of an example embodiment of a seat assembly for the electric scooter including a latching mechanism in accordance with aspects of the present disclosure.

Referring now to FIG. 2, a close up of the example embodiment of seat assembly 122 at the rear of electric scooter 100 is shown. In an example embodiment, seat assembly 122 includes a seat 200 having a seat surface 202. Seat surface 202 is a substantially rectangular planar surface that has an approximately horizontal orientation configured to provide a platform to allow a user of electric scooter 100 to sit on seat 200 when electric scooter 100 is in the riding configuration. In some embodiments, seat 200 is attached on top of a seat post 204 that is configured to mount to a corresponding frame post that is attached internally to the inside of electric scooter 100 (e.g., inside outer casing 102).

According to the example embodiments described herein, seat assembly 122 also includes a latching mechanism 206 that assists with securing and stabilizing seat 200 when electric scooter 100 is in a riding configuration. In an example embodiment, latching mechanism 206 is configured to secure seat 200 with seat surface 202 in a substantially horizontal orientation (as shown in FIG. 2) so that a user may comfortably sit on seat 200. With this arrangement, a user of electric scooter 100 may sit on seat 200 of seat assembly 122 while riding electric scooter 100 in the riding configuration.

In some embodiments, latching mechanism 206 may be disposed on one side of seat post 204 facing towards one of first side surface 104 or second side surface 106. That is, rather than being located on a front or rear of seat post 204, latching mechanism 206 instead is arranged to be side facing on seat post 204. In this embodiment, latching mechanism 206 faces in a direction towards first side surface 104. It should be understood, however, that in other embodiments, latching mechanism 206 may face in the opposite direction (i.e., towards second side surface 106). By arranging latching mechanism 206 on seat post 204 of seat assembly 122 in a side-facing orientation, the components of latching mechanism 206 may be easily accessed and operated by a user of electric scooter 100.

In an example embodiment, seat assembly 122 is configured to be removably attached to electric scooter 100. As shown in FIG. 2, seat post 204 of seat assembly 122 is disposed within an opening 208 between first side surface 104 and the opposite second side surface 106 so that a bottom end of seat post 204 may mate with and connect to a corresponding frame post inside outer casing 102 of electric scooter 100 (e.g. frame post 1102 shown in FIG. 11 and described below).

Figure 3:
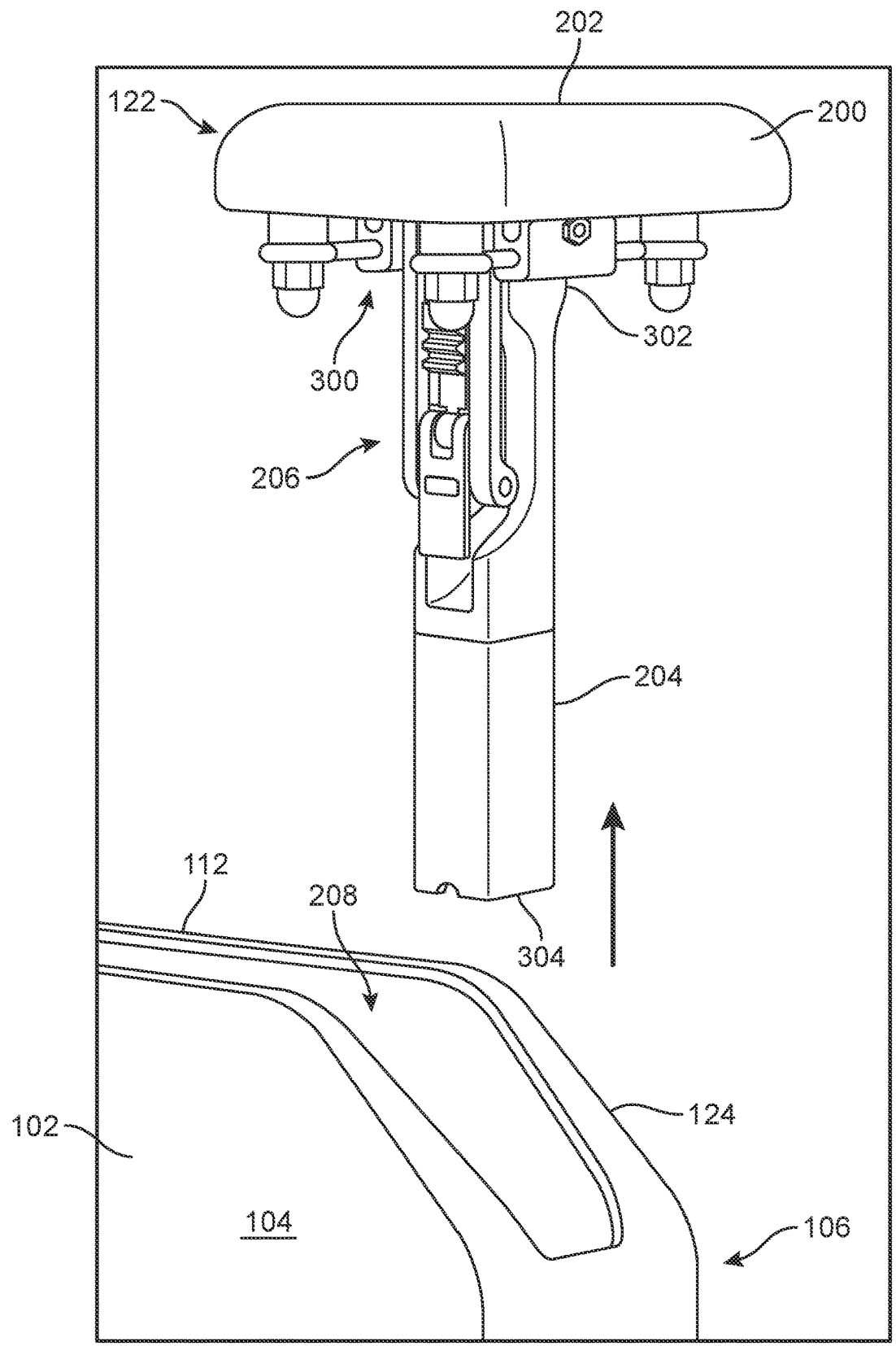
FIG. 3 is a close up view of the example embodiment of the seat assembly including the latching mechanism detached from the electric scooter in accordance with aspects of the present disclosure.

FIGS. 3-11 illustrate an exemplary process of transitioning a foldable seat with a latching mechanism described herein from a riding configuration on a personal transport device to a stowed configuration. Referring now to FIG. 3, seat assembly 122 is shown detached from a frame post disposed inside outer casing 102 of electric scooter 100. In some embodiments, seat assembly 122 may include a seat support bracket 300 disposed beneath seat 200 that attaches or connects a top end 302 of seat post 204 with the underside of seat 200. At an opposite end of seat post 204 from top end 302 is a bottom end 304. In an example embodiment, bottom end 304 of seat post 204 has an opening that is configured to attach or mate with a corresponding portion of the frame post attached internally within outer casing 102 of electric scooter. In an example embodiment, seat assembly 122 is positioned within opening 208 between the opposing sides (e.g., first side surface 104 and second side surface 106) of outer casing 102 and is detached from the frame post by applying an upward force that separates seat post 204 from its engagement with the frame post.

Figure 4:
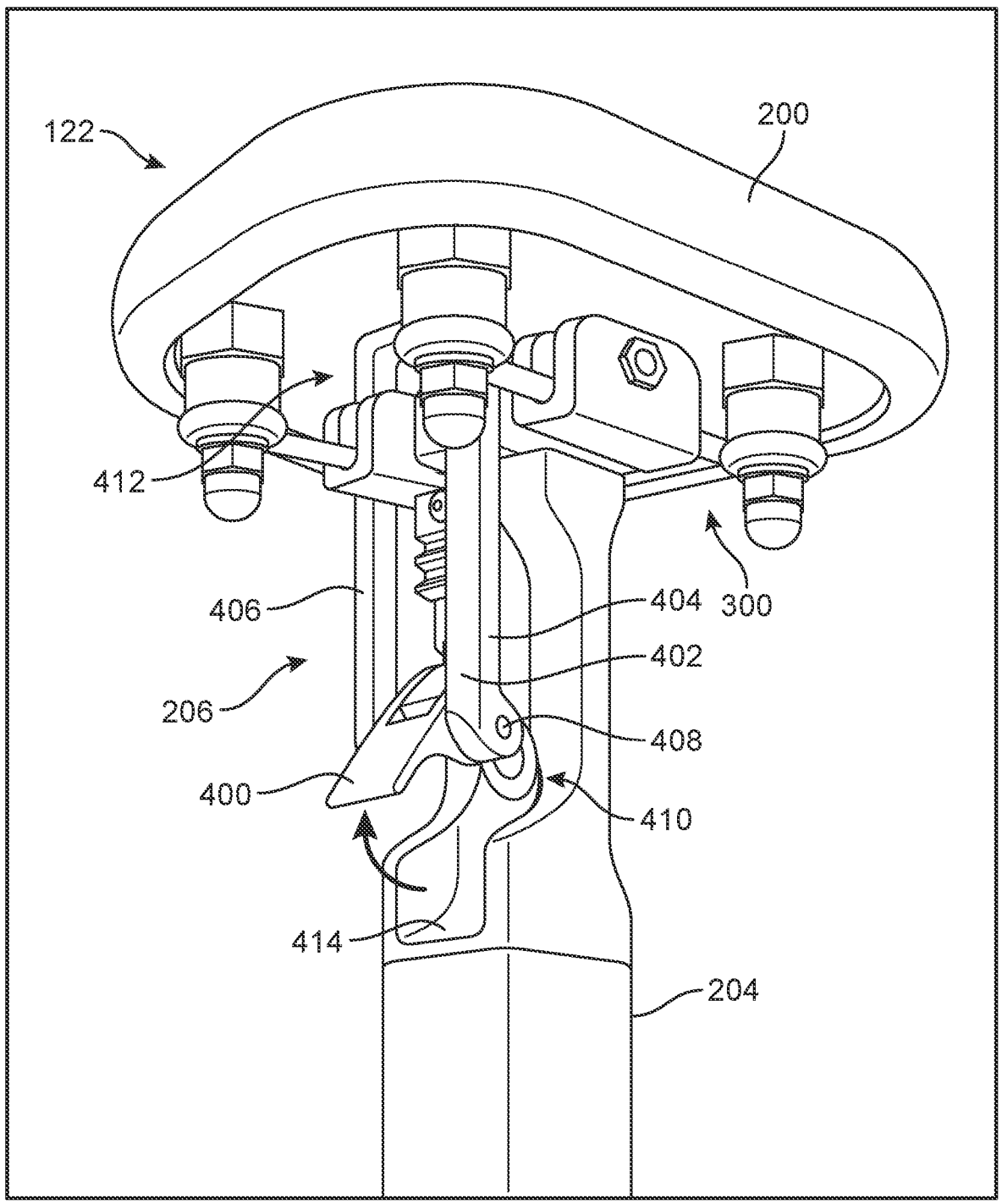
FIG. 4 is a close up view of the example embodiment of the seat assembly including the latching mechanism in the process of transitioning to a released configuration in accordance with aspects of the present disclosure.

Before or after detaching seat assembly 122 from the frame post inside outer casing 102 of electric scooter 100, latching mechanism 206 may be operated by a user to allow seat assembly 122 to fold to transition electric scooter 100 from the riding configuration to the stowed configuration. Referring now to FIG. 4, in an example embodiment, a clamp 400 of latching mechanism 206 is disposed on seat post 204. Clamp 400 is configured to exert a downward clamping force that secures latching mechanism 206 in place when clamp 400 is in a locked position.

In this embodiment, clamp 400 of latching mechanism 206 is moved upwards from an initial locked position (shown in FIG. 3) approximately parallel to seat post 204 to an opened position where clamp 400 extends outward from the side of seat post 204. In one embodiment, clamp 400 in the opened position is approximately perpendicular to seat post 204. In other embodiments, clamp 400 in the opened position may be at an angle to seat post 204 that is greater than or less than 90 degrees.

When clamp 400 is moved from the initial locked position to the opened position, a clamping force applied by clamp 400 to a latch arm 402 of latching mechanism 206 is released. In an example embodiment, latch arm 402 of latching mechanism 206 includes a pair of approximately parallel arm members, including a first arm member 404 and a second arm member 406, that extend upwards from clamp 400 towards seat support bracket 300 on the underside of seat 200. Latch arm 402 is connected to seat post 204 by a pivot mechanism 408 at a pivot end 410 of latch arm 402. Pivot end 410 is disposed opposite from a catch end 412 where latch arm 402 engages with a portion of seat support bracket 300 to lock and secure seat 200 of seat assembly 122 in the riding configuration with seat surface 202 in an approximately horizontal orientation.

As shown in FIG. 4, first arm member 404 and second arm member 406 are attached to pivot mechanism 408 on opposite sides of latch arm 402 at pivot end 410 and extend upwards towards catch end 412. In one embodiment, clamp 400 is located above pivot mechanism 408 and is disposed between first arm member 404 and second arm member 406 at pivot end 410 of latch arm 402. In some embodiments, a recess 414 may be provided along the side of seat post 204 beneath clamp 400 to allow for easier access by a finger of a user to move clamp 400 from the initial locked position to the opened position.

Figure 5:
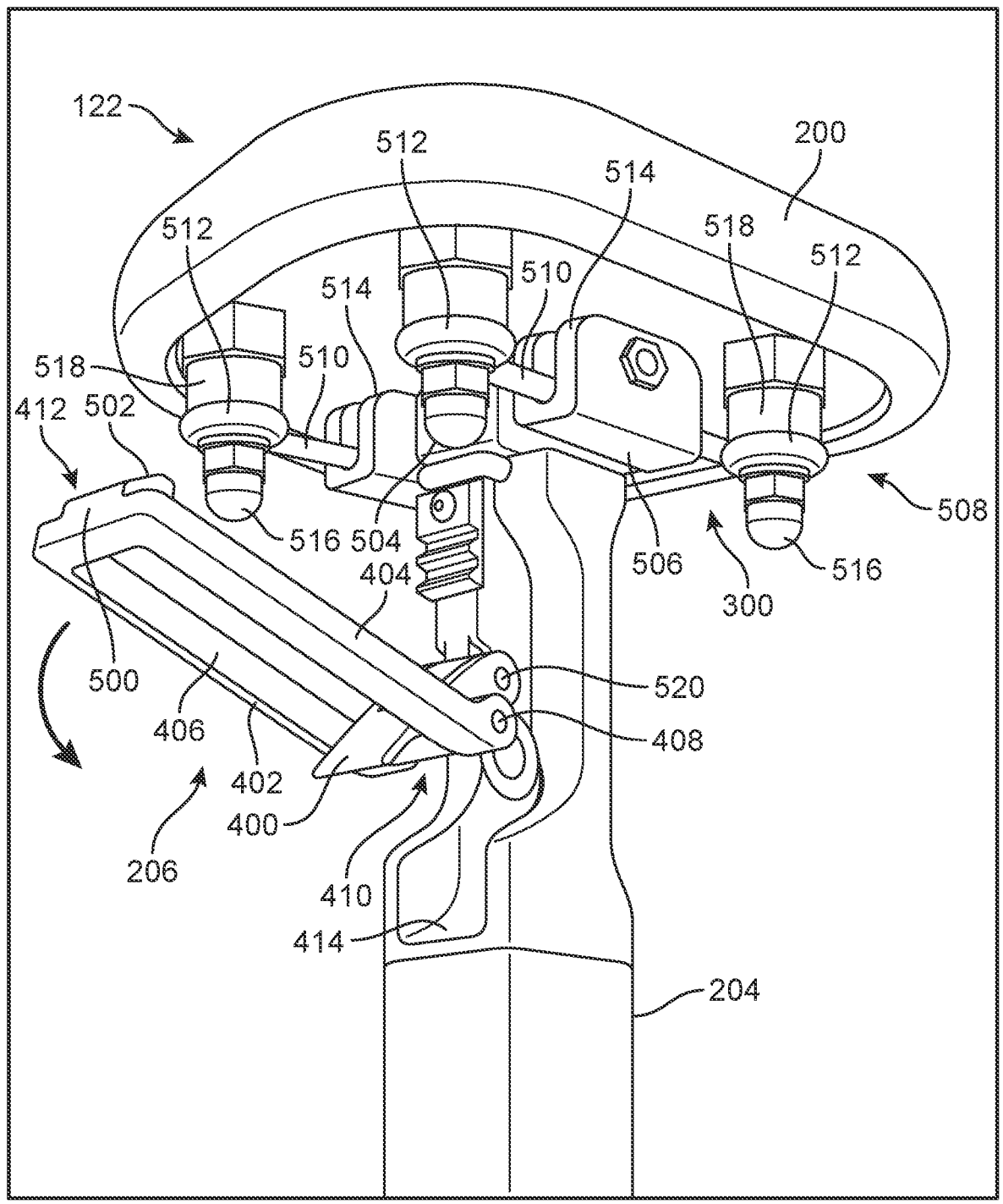
FIG. 5 is a close up view of the latching mechanism continuing to transition to the released configuration in accordance with aspects of the present disclosure.

Referring now to FIG. 5, in an example embodiment, clamp 400 is attached to a fulcrum 520 on seat post 204. Clamp 400 may pivot at fulcrum 520 to allow clamp 400 to be moved or transitioned between the initial locked position (as shown in FIG. 3) where clamp 400 applies a downward clamping force to the opened position (as shown in FIG. 4) where the clamping force is released. Once clamp 400 has been released (i.e. moved to the opened position as shown in FIGS. 4 and 5), latch arm 402 of latching mechanism 206 may be moved or transitioned into a released configuration. In an example embodiment, a hooked catch 500 is disposed at catch end 412 of latch arm 402. As shown in FIG. 5, hooked catch 500 is disposed between first arm member 404 and second arm member 406 at catch end 412 of latch arm 402. In one embodiment, hooked catch 500 may include an angled edge 502 that is sloped or angled downward towards pivot end 410 of latch arm 402. Angled edge 502 of hooked catch 500 is configured to mate and engage with a catch receiver 504 on a bracket body 506 of seat support bracket 300 on the underside of seat 200.

In an example embodiment, angled edge 502 of hooked catch 500 fits into catch receiver 504 of bracket body 506. When clamp 400 is in the initial locked position (as shown in FIG. 3) it applies a downward clamping force on angled edge 502 of hooked catch 500 within catch receiver 504 on bracket body 506 of seat support bracket 300 so that latch arm 402 of latching mechanism 206 is secured to bracket body 506 on the underside of seat 200. With this arrangement, latching mechanism 206 locks and secures seat 200 of seat assembly 122 in the riding configuration.

When clamp 400 is moved to the opened position (as shown in FIG. 4), the downward clamping force on angled edge 502 of hooked catch 500 within catch receiver 504 is released so that latch arm 402 may be released from its engagement with bracket body 506 of seat support bracket 300. In an example embodiment, latch arm 402 may then be moved away from bracket body 506 to the released configuration. As shown in FIG. 5, hooked catch 500 at catch end 412 of latch arm 402 moves outward away from seat 200 by action of pivot mechanism 408 at pivot end 410 of latch arm 402 in the released configuration. With this arrangement, latch arm 402 of latching mechanism 206 may be released from its engagement with bracket body 506 to assist with transitioning seat assembly 122 to a folded position.

In some embodiments, seat assembly 122 may further include components configured to provide comfort to a user of electric scooter 100 when in the riding configuration. In an example embodiment, seat assembly 122 includes a suspension system 508 on the underside of seat 200. In this embodiment, suspension system 508 includes a pair of braces 510 beneath seat 200 that extend substantially laterally across a width of seat 200. In one embodiment, opposite ends of each brace of pair of braces 510 include round or circular openings. As shown in FIG. 5, opposite ends of each brace of pair of braces 510 include round or circular openings in the form of eyelets 512. Additionally, braces 510 are attached or secured to bracket body 506 of seat support bracket 300 by a pair of brace mounts 514 that connect a portion of each brace of braces 510 between opposite ends to bracket body 506.

In an example embodiment, eyelets 512 allow pair of braces 510 to be secured to the underside of seat 200 using fasteners 516. Fasteners 516 extend through eyelets 512 at the ends of pair of braces 510 to secure braces 510 to seat 200. In an example embodiment, suspension system 508 also includes bushings 518 that are disposed between the underside of seat 200 and each eyelet 512 of braces 510. Bushings 518 surround fasteners 516 and provide a dampening effect between seat 200 and braces 510. In one embodiment, bushings 518 are formed of rubber or other material configured to dampen vibrations and shocks. In some cases, a durometer of the material forming bushings 518 may be tuned or changed to provide various amounts of dampening force. For example, in one embodiment, the durometer may be tuned or changed based on a user of electric scooter 100 and/or a surface on which electric scooter 100 may be ridden. With this arrangement, suspension system 508 of seat assembly 122 may be configured to absorb vibrations and shocks to a user of electric scooter 100 in the riding configuration.

Figure 6:
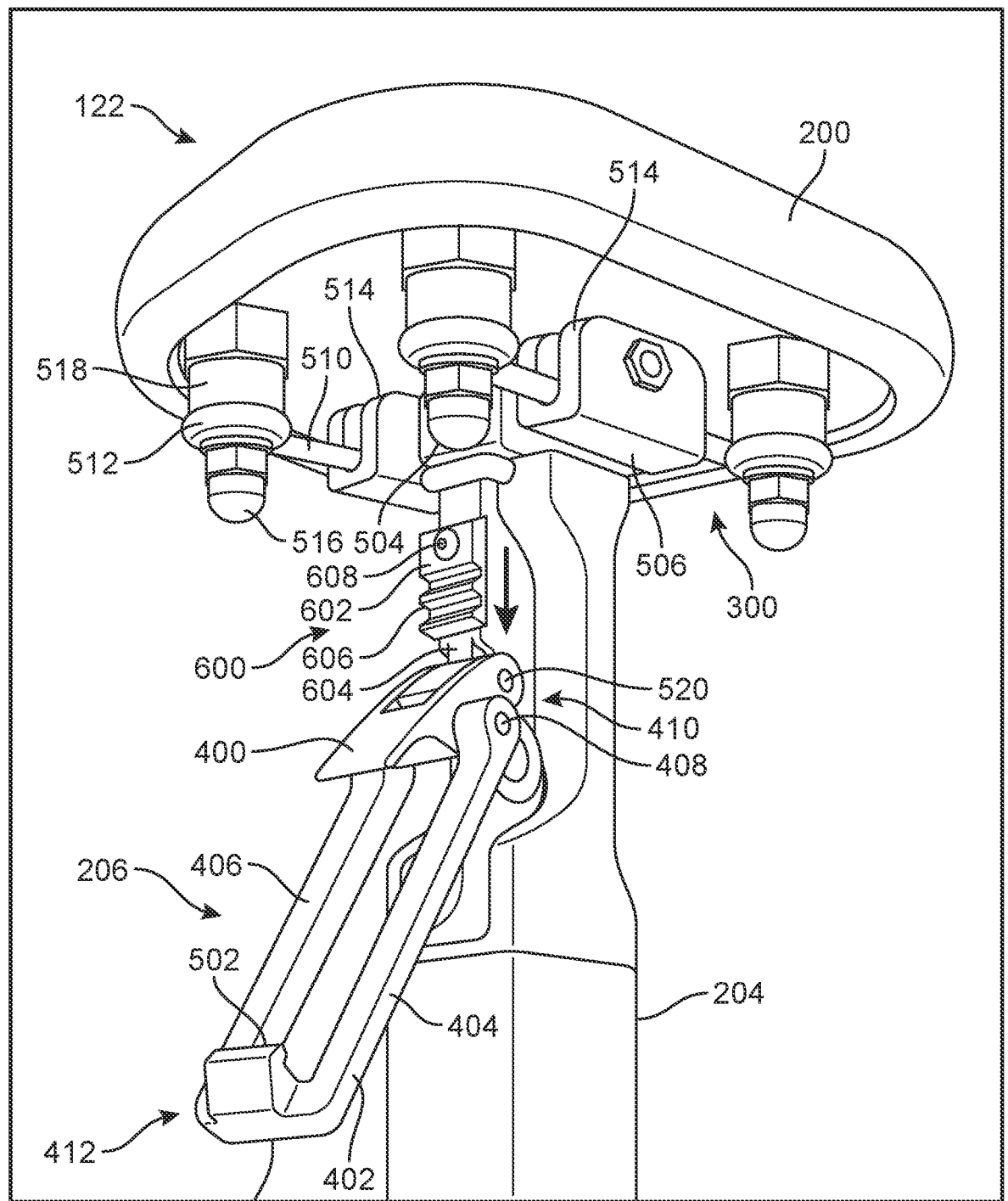
FIG. 6 is a close up view of a release element of the latching mechanism sliding downwards on a track to allow the seat of the seat assembly to be folded in accordance with aspects of the present disclosure.

Referring now to FIG. 6, latch arm 402 has been moved or transitioned to the released configuration by removing angled edge 502 of hooked catch 500 from its engagement with catch receiver 504 and pivoting latch arm 402 away from seat 200, as described above with reference to FIG. 5. Next, a release element 600 of latching mechanism 206 on seat assembly 122 may be moved to allow seat 200 to be transitioned to a folded position. In some embodiments, release element 600 includes a slide body 602 that is configured to move in a vertical direction (i.e., up and down) along a track 604 on seat post 204. As shown in FIG. 6, track 604 on seat post 204 extends in a substantially vertical direction from the underside of seat 200 towards pivot end 410 of latch arm 402.

Slide body 602 of release element 600 may be moved from a secured position at a top of track 604 on seat post 204 in a downward direction along track 604 towards pivot mechanism 408 at pivot end 410 of latch arm 402 to a released position. In some embodiments, a surface of slide body 602 of release element 600 may include grooves 606 to provide friction or grip to a finger of a user to assist with applying a downward force to move slide body 602 along track 604 on seat post 204. A peg 608 extends through slide body 602 and into seat post 204 where it engages with a spring-loaded barrel pin (shown in FIG. 7).

Figure 7:
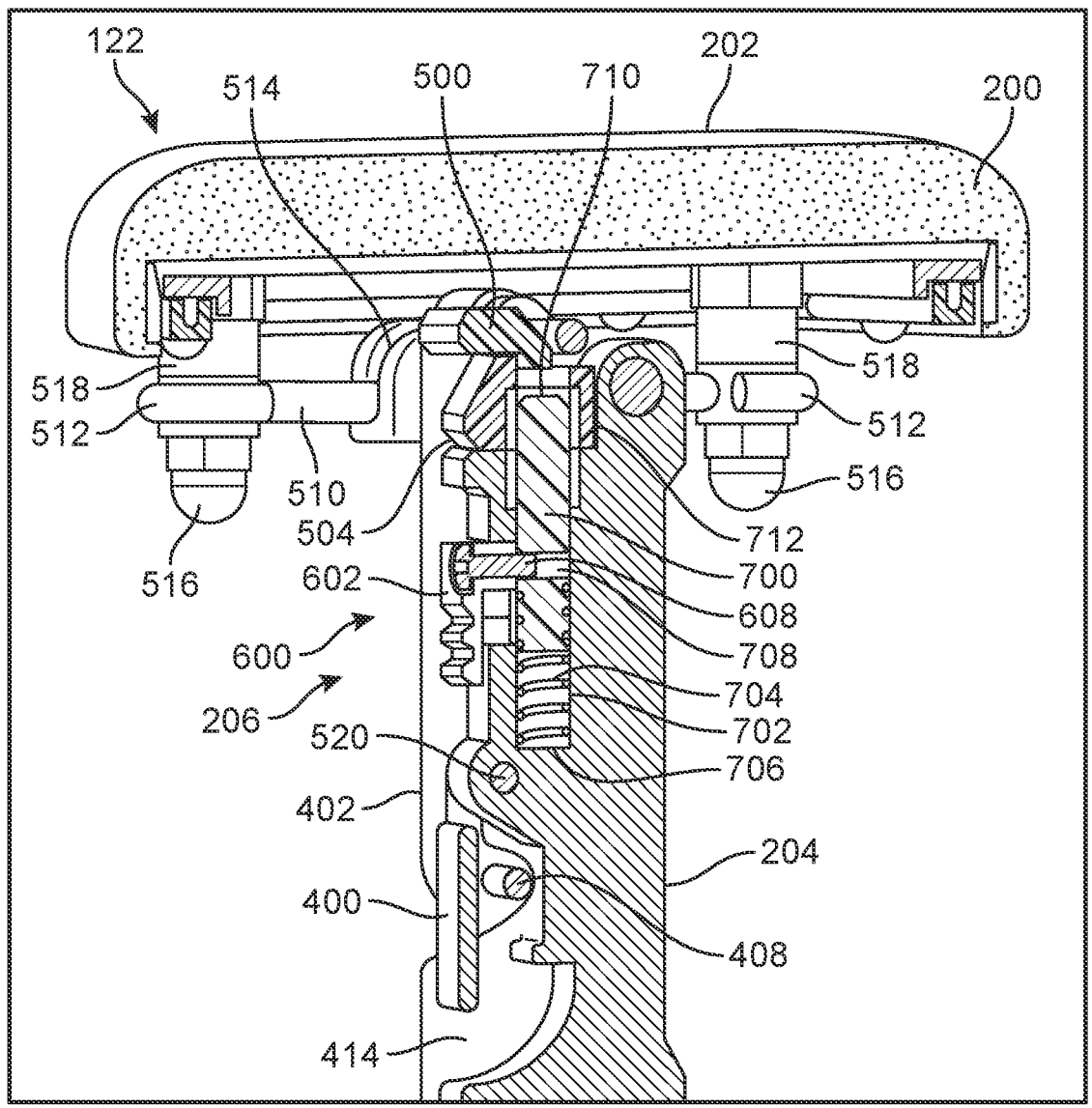
FIG. 7 is a cross-section view of the example embodiment of the seat assembly including the latching mechanism in accordance with aspects of the present disclosure.

Referring now to FIG. 7, a cross-section view of seat assembly 122 is shown. In this embodiment, a barrel pin 700 is positioned within a cavity 702 inside seat post 204. In an example embodiment, barrel pin 700 may be spring-loaded so that it returns to its initial position. As shown in FIG. 7, a spring 704 is located at a bottom end 706 of cavity 702 beneath barrel pin 700. Peg 608 of release element 600 extends through slide body 602 and into a slot 708 in barrel pin 700. In an example embodiment, peg 608 is oriented perpendicularly to slide body 602 and barrel pin 700.

At the opposite end of cavity 702, a tip 710 of barrel pin 700 extends upwards into a pin receiver 712 in bracket body 506 of seat assembly 122 underneath seat 200. In an example embodiment, barrel pin 700 has a cylindrical shape and pin receiver 712 is a circular or round recess configured to accept or receive correspondingly-shaped tip 710 of barrel pin 700. When a downward force is applied to slide body 602 of release element 600, the downward force causes peg 608 to move barrel pin 700 downwards and compresses spring 704 at bottom end 706 of cavity 702. This downward movement of barrel pin 700 within cavity 702 also moves tip 710 of barrel pin 700 so as to release tip 710 from pin receiver 712 in bracket body 506. Once tip 710 of barrel pin 700 is released from pin receiver 712, seat 200 of seat assembly 122 may be allowed to fold via a tilt mechanism (shown in FIG. 8).

Additionally, when the downward force on release element 600 is removed, because barrel pin 700 is spring-loaded (e.g., spring 704 is compressed when barrel pin 700 moves downward within cavity 702), barrel pin 700 moves back upwards to its initial position. That is, with the downward force applied to release element 600 and transferred to barrel pin 700 via peg 608 removed, compressed spring 704 at bottom end 706 of cavity 702 applies an upward, restoring force that moves barrel pin 700 back to its initial position inside cavity 702 and spring 704 returns to an uncompressed state.

Figure 8:
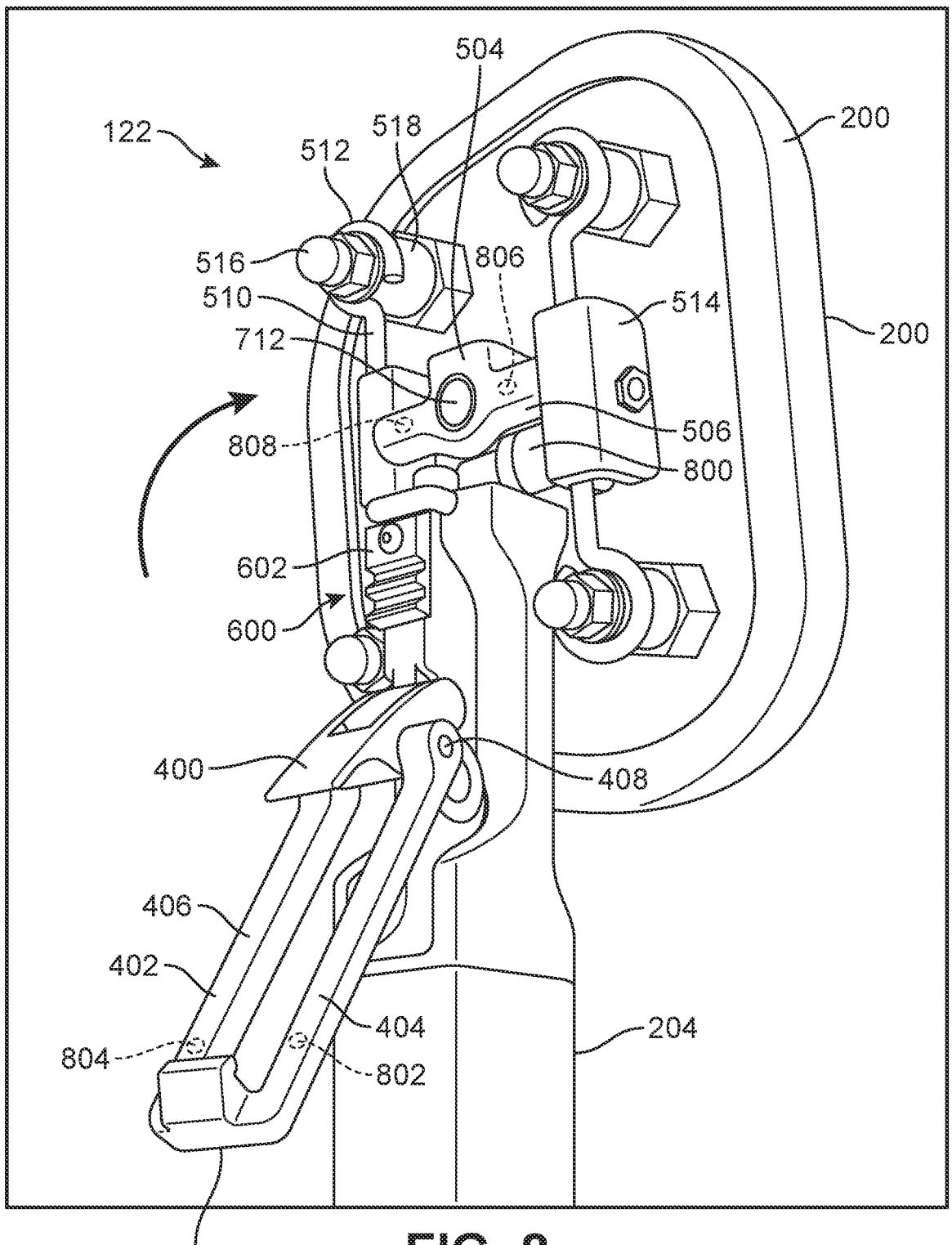
FIG. 8 is a close up view of the seat of the seat assembly being folded in accordance with aspects of the present disclosure.

Referring now to FIG. 8, seat 200 of seat assembly 122 is shown being folded or transitioned from a horizontal riding position to a folded position. In some embodiments, seat 200 of seat assembly 122 is attached to seat post 204 via a tilt mechanism 800. In an example embodiment, tilt mechanism 800 may include a hinge or similar mechanism that allows seat 200 to tilt or fold. In one embodiment, tilt mechanism 800 permits seat 200 to tilt or fold from a first orientation (e.g., riding position) where seat 200 is substantially perpendicular to seat post 204 so that seat surface 202 has an approximately horizontal orientation when electric scooter 100 is in the riding configuration to a second orientation (e.g., folded position) where seat 200 is substantially parallel to seat post 204 so that seat assembly 122 may be stored inside outer casing 102 of electric scooter 100 in the stowed configuration. With this arrangement, tilt mechanism 800 may assist a user with converting electric scooter 100 from the riding configuration to the stowed configuration.

In an example embodiment, tilt mechanism 800 may be engaged or operated once tip 710 of barrel pin 700 is removed from pin receiver 712 in bracket body 506 by action of release element 600, as described above in reference to FIG. 7. As shown in FIG. 8, in one embodiment, tilt mechanism 800 is configured so that seat 200 folds in a direction towards one side of electric scooter 100. That is, seat 200 is folded in a lateral direction such that when seat 200 is in the folded position (as shown in FIG. 8), seat surface 202 is approximately parallel to first side surface 104 and/or second side surface 106 of outer casing 102.

In some embodiments, latching mechanism 206 may include features configured to secure latch arm 402 in place when seat 200 is in the folded position. In an example embodiment, first arm member 404 and second arm member 406 of latch arm 402 may include embedded magnets that mate or removably connect with corresponding magnets on a portion of bracket body 506 on the underside of seat 200. In this embodiment, a first magnet 802 is embedded within first arm member 404 and a second magnet 804 is embedded within second arm member 406. First magnet 802 and second magnet 804 are located near catch end 412 of latch arm 402 and are configured to be positioned adjacent to corresponding magnets on bracket body 506 of seat bracket 300 on underside of seat 200.

As shown in FIG. 8, a third magnet 806 is embedded in bracket body 506 on one side of pin receiver 712 and a fourth magnet 808 is embedded in bracket body 506 on the opposite side of pin receiver 712. With this arrangement, latch arm 402 may be moved back upwards towards the underside of seat 200 (e.g. via pivot mechanism 408) so that first magnet 802 in first arm member 404 mates or removably connects with third magnet 806 on bracket body 506 and second magnet 804 in second arm member 406 mates or removably connects with fourth magnet 808 on bracket body 506.

Figure 9:
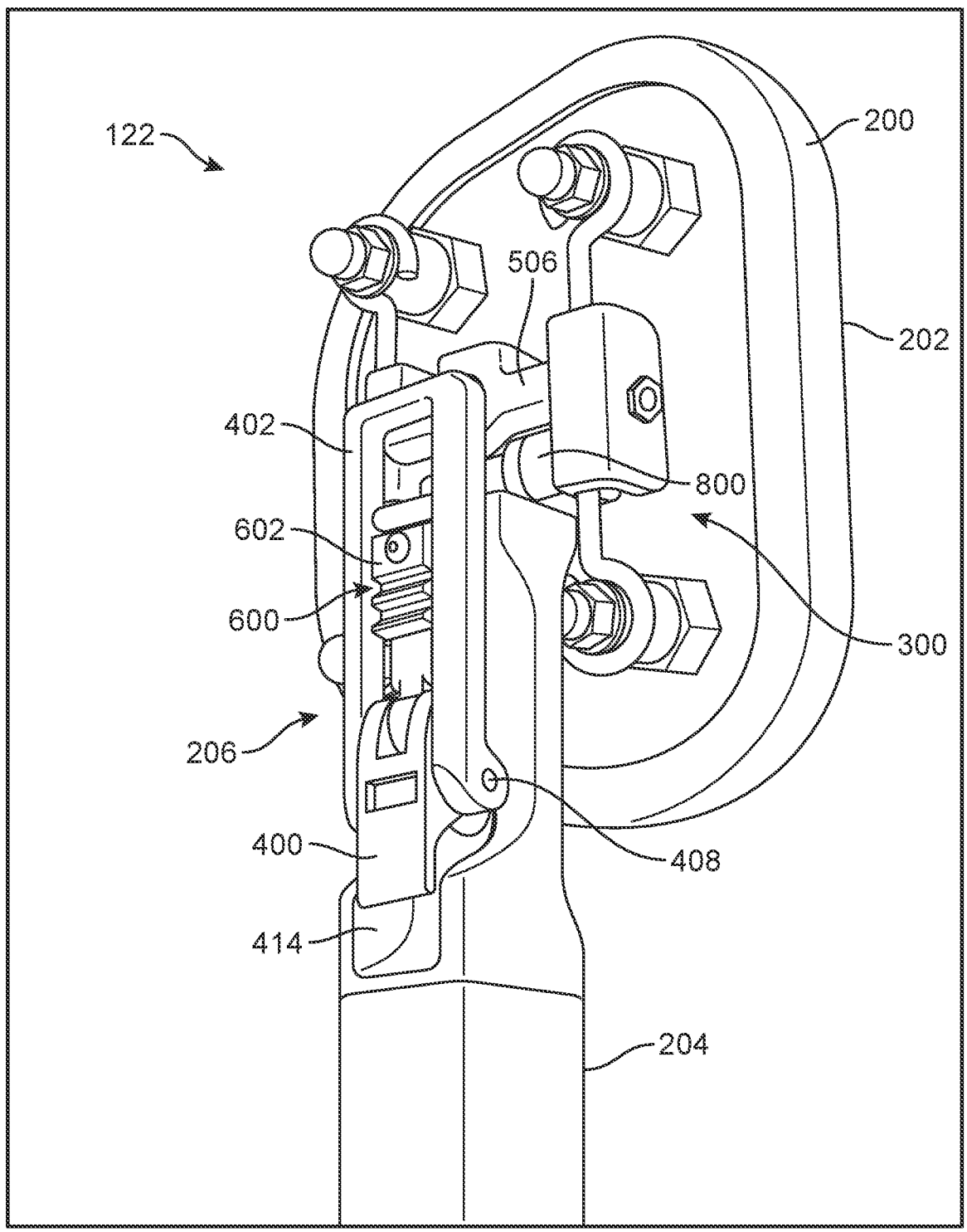
FIG. 9 is a close up view of the seat of the seat assembly folded to one side and the latch arm of the latching mechanism shown in a storage configuration in accordance with aspects of the present disclosure.

As shown in FIG. 9, latch arm 402 is moved back upwards to a vertical orientation with seat 200 of seat assembly 122 in the folded position. Magnets 802, 804 on first arm member 404 and second arm member 406 attach to magnets 806, 808 embedded in bracket body 506 on the underside of seat 200 so that latch arm 402 is restrained from moving. With this arrangement, seat assembly 122 may be stored inside outer casing 102 of electric scooter 100 in the stowed configuration.

Figure 10:
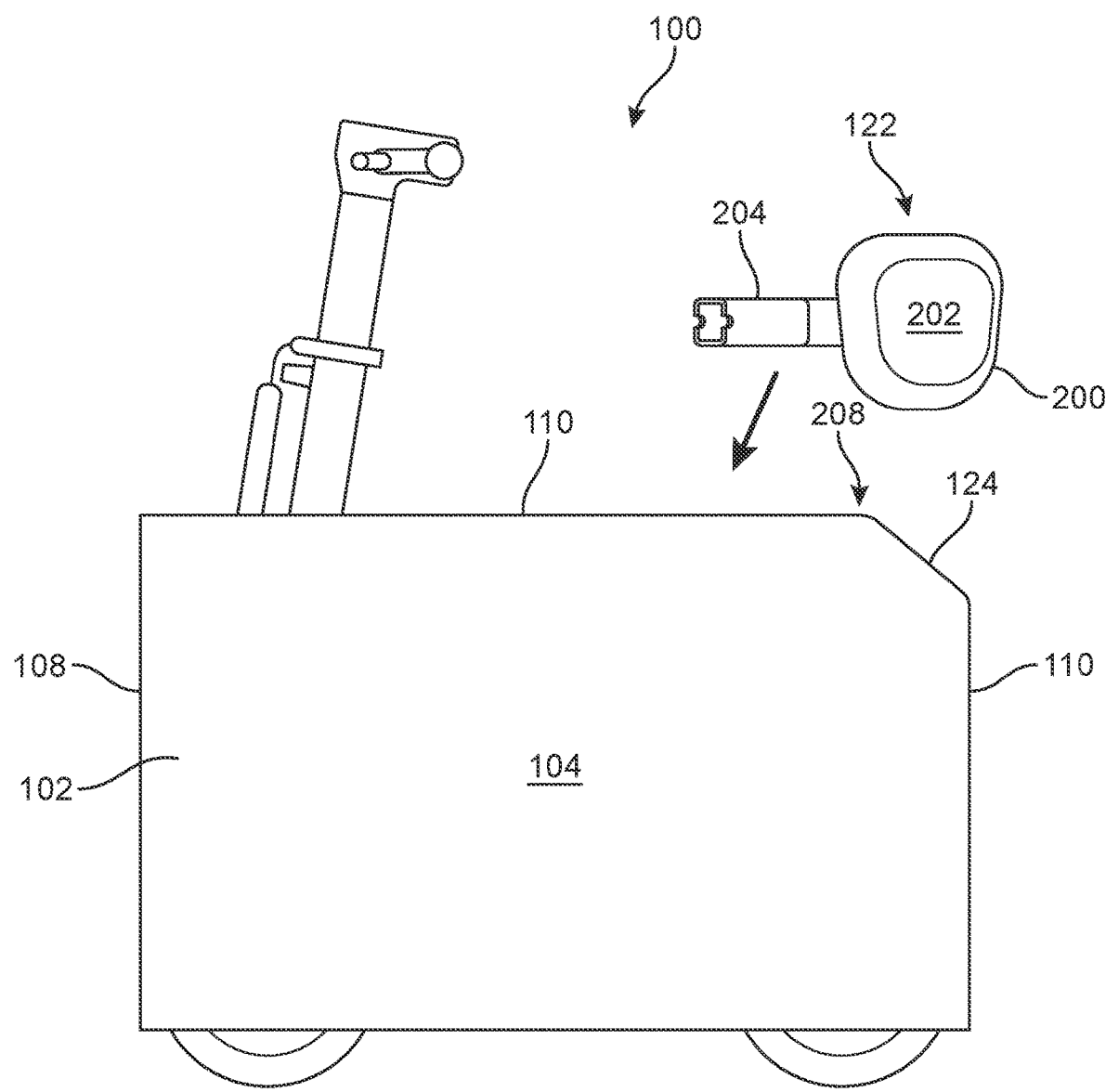
FIG. 10 is a representative view of the example embodiment of the folded seat assembly being stowed inside the electric scooter in accordance with aspects of the present disclosure.

In an example embodiment, when a user transitions electric scooter 100 from the riding configuration to the stowed configuration, seat assembly 122 may be removed from the frame post inside electric scooter 100 and stored inside outer casing 102 of electric scooter 100. Referring now to FIG. 10, seat assembly 122 is shown removed from electric scooter 100, for example, following the process of transitioning latching mechanism 206 to the released configuration as described with reference to FIGS. 3-9. In an example embodiment, once seat assembly 122 is removed from electric scooter 100, seat 200 may be folded for storage inside outer casing 102 of electric scooter 100.

In some embodiments, seat 200 of seat assembly 122 may be tilted or folded sideways (e.g., in a direction towards one of first side surface 104 or second side surface 106) via tilt mechanism 800 connecting seat 200 to seat post 204 so that seat assembly 122 may be placed in a folded position (as shown in FIG. 9). In the folded position, seat assembly 122 may fit within opening 208 between first side surface 104 and opposite second side surface 106 of outer casing 102 and be stored within an internal storage compartment of electric scooter 100.

Once seat 200 of seat assembly 122 is in the folded position, seat assembly 122 may be conveniently stored inside outer casing 102 of electric scooter 100. As shown in FIG. 10, seat assembly 122 is placed into opening 208 along top edge 112 of outer casing 102 of electric scooter 100 with seat post 204 facing forwards (i.e., in a direction towards front edge 108) and seat 200 facing rearwards (i.e., in an opposite direction towards rear edge 110). Additionally, as shown in FIG. 10, tilt mechanism 800 (shown in FIGS. 8 and 9) is configured to fold seat 200 sideways relative to seat post 204 so that seat surface 202 is approximately parallel to sides 104, 106 of outer casing 102 of electric scooter 100. With this arrangement, seat assembly 122 in the folded position is able to fit within opening 208 between first side surface 104 and opposite second side surface 106 of outer casing 102 for storage within an internal storage compartment of electric scooter 100.

Figure 11:
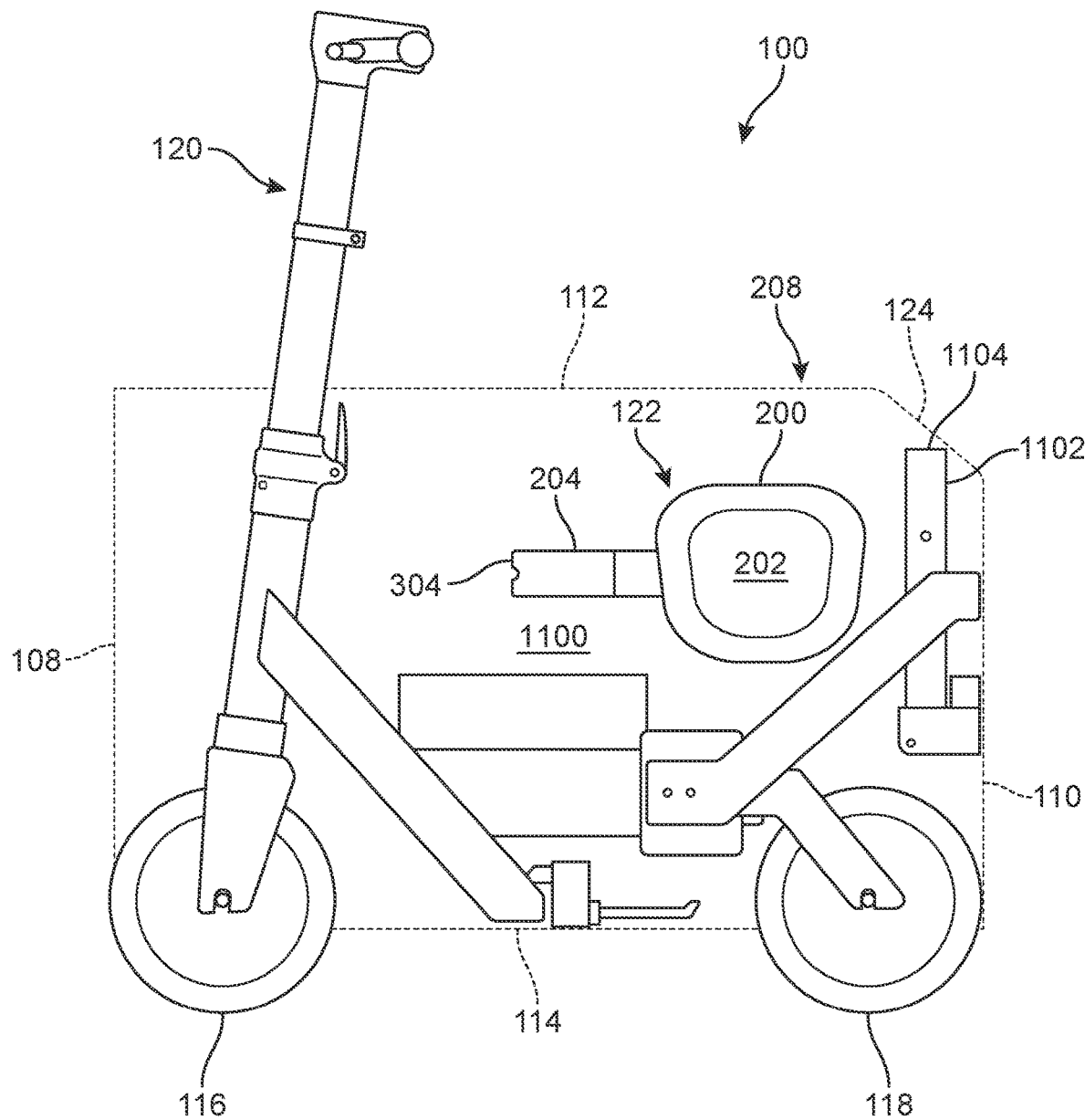
FIG. 11 is a side internal view of the example embodiment of the electric scooter with the seat assembly stored inside an internal storage compartment in accordance with aspects of the present disclosure.

Referring now to FIG. 11, seat assembly 122 with seat 200 in the folded position is shown stored within the interior of electric scooter 100. In some embodiments, seat assembly 122 may be placed into an interior storage compartment 1100. In this embodiment, seat assembly 122 is placed into interior storage compartment 1100 with bottom end 304 of seat post 204 facing towards front edge 108 of electric scooter 100 and seat 200 facing towards rear edge 110 of electric scooter 100. In other embodiments, interior storage compartment 1100 may have different arrangements to accommodate other orientations or placements of seat assembly 122 within the interior of electric scooter 100.

Additionally, as shown in FIG. 11, a frame post 1102 attached internally to components inside electric scooter 100 is visible. In an example embodiment, bottom end 304 of seat post 204 is configured to fit over and removably attach to a top portion 1104 of frame post 1102 when electric scooter 100 is in the riding configuration, for example, as shown in FIG. 1. It should be understood that seat assembly 122 may also be transitioned from the folded position to the riding position by performing the steps described with reference to FIGS. 3-11 in the opposite order.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A latching mechanism for a seat assembly comprising:
a pivot mechanism;
a clamp located above the pivot mechanism;
a latch arm attached to the pivot mechanism at a pivot end of the latch arm;
a hooked catch disposed at a catch end of the latch arm opposite the pivot end;
a catch receiver associated with an underside of a seat of the seat assembly, the catch receiver configured to engage with the hooked catch of the latch arm;
a release element that is configured to slide vertically along a track that extends downwards from the underside of the seat;
a pin receiver on the underside of the seat and a barrel pin disposed inside a cavity of a seat post of the seat assembly;
wherein the release element is configured to engage the barrel pin disposed inside the cavity of the seat post;
wherein a tip of the barrel pin fits into the pin receiver;
wherein, when the tip of the barrel pin is removed from the pin receiver, a tilt mechanism that attaches the seat to the seat post is allowed to tilt to fold the seat to one side of the seat post so that a seat surface of the seat is approximately parallel to the seat post; and
wherein, when the clamp is in a locked position, the hooked catch is configured to exert a downward clamping force on the catch receiver to secure the seat in a riding configuration.

2. The latching mechanism according to claim 1, wherein the latch arm comprises a first arm member and a second arm member, the first arm member and the second arm member being parallel to each other;

wherein the clamp is disposed between the first arm member and the second arm member at the pivot end of the latch arm; and wherein the hooked catch is disposed between the first arm member and the second arm member at the catch end of the latch arm.

3. The latching mechanism according to claim 2, wherein the catch receiver is disposed on a bracket body on the underside of the seat.

4. The latching mechanism according to claim 3, further comprising:

at least one magnet associated with the first arm member and/or the second arm member of the latch arm; and at least one magnet associated with the bracket body on the underside of the seat;

wherein the at least one magnet associated with the first arm member and/or the second arm member of the latch arm is configured to mate with the at least one magnet associated with the bracket body on the underside of the seat to hold the latch arm in a vertical orientation.

5. The latching mechanism according to claim 1, wherein, when the clamp is in an opened position, the downward clamping force on the catch receiver is released so as to allow the latch arm to pivot at the pivot mechanism.

6. The latching mechanism according to claim 1, further comprising an angled edge on the hooked catch.

7. The latching mechanism according to claim 1, wherein the latching mechanism is disposed on the seat post of the seat assembly beneath the seat.

8. A seat assembly for a personal transport device comprising:

a seat having a seat surface;

a seat post attached to an underside of the seat via a tilt mechanism;

a latching mechanism comprising a pivot mechanism, a clamp located above the pivot mechanism, a latch arm attached to the pivot mechanism at a pivot end of the latch arm, a hooked catch disposed at a catch end of the latch arm opposite the pivot end, and a catch receiver associated with the underside of the seat, the catch receiver configured to engage with the hooked catch of the latch arm;

a release element that is configured to slide vertically along a track that extends downwards along the seat post from the underside of the seat;

a pin receiver on the underside of the seat and a barrel pin disposed inside a cavity of the seat post;

wherein the release element is configured to engage the barrel pin disposed inside the cavity of the seat post;

wherein a tip of the barrel pin fits into the pin receiver;

wherein, when the tip of the barrel pin is removed from the pin receiver, the tilt mechanism is allowed to tilt to fold the seat to one side of the seat post so that the seat surface is approximately parallel to the seat post; and wherein, when the clamp is in a locked position, the hooked catch is configured to exert a downward clamping force on the catch receiver to secure the seat in a riding configuration so that the seat surface has a horizontal orientation.

9. The seat assembly according to claim 8, further comprising a spring at a bottom end of the cavity of the seat post beneath the barrel pin; and wherein downward movement of the release element along the track on the seat post causes the barrel pin to compress the spring.

10. The seat assembly according to claim 8, wherein the latch arm comprises a first arm member and a second arm member, the first arm member and the second arm member being parallel to each other;

wherein the clamp is disposed between the first arm member and the second arm member at the pivot end of the latch arm; and wherein the hooked catch is disposed between the first arm member and the second arm member at the catch end of the latch arm.

11. The seat assembly according to claim 10, wherein the catch receiver is disposed on a bracket body on the underside of the seat.

12. The seat assembly according to claim 11, further comprising:

at least one magnet associated with the first arm member and/or the second arm member of the latch arm; and at least one magnet associated with the bracket body on the underside of the seat;

wherein the at least one magnet associated with the first arm member and/or the second arm member of the latch arm is configured to mate with the at least one magnet associated with the bracket body on the underside of the seat to hold the latch arm in a vertical orientation.

13. The seat assembly according to claim 8, wherein the tilt mechanism is configured to fold the seat to a side of the seat post so that the seat surface of the seat is approximately parallel to a side of the personal transport device.

14. The seat assembly according to claim 8, further comprising a recess along a side of the seat post beneath the clamp.

* * * * *